March 30, 1965 G. E. MATHER 3,175,836
LOAD RESPONSIVE WHEEL SUSPENSION FOR VEHICLES
Original Filed Nov. 26, 1957 2 Sheets-Sheet 1
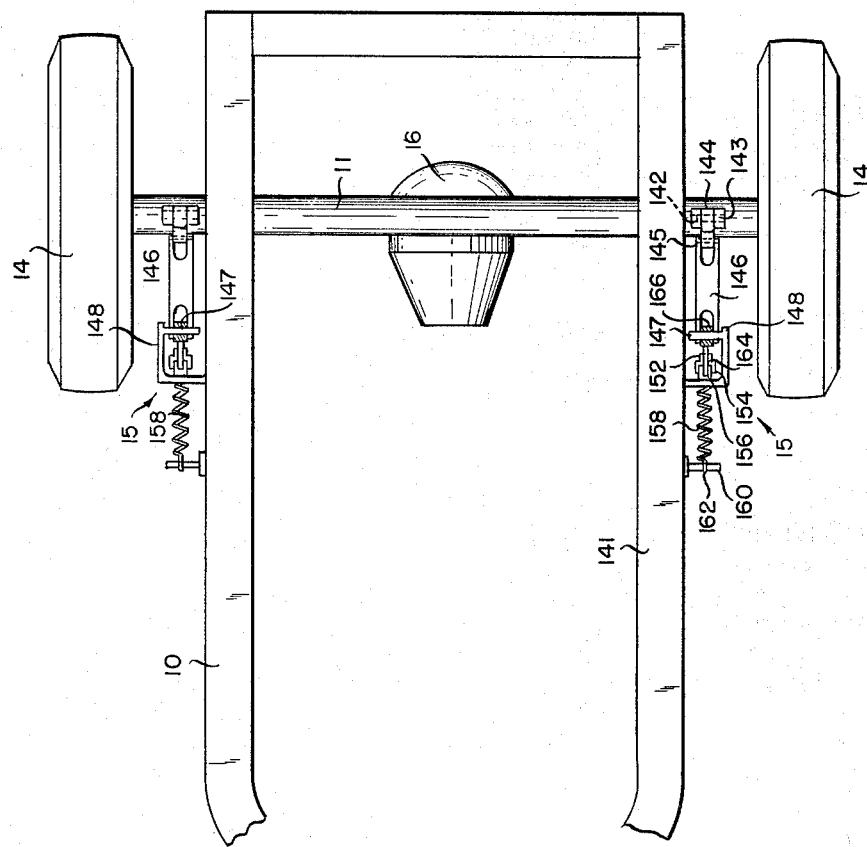
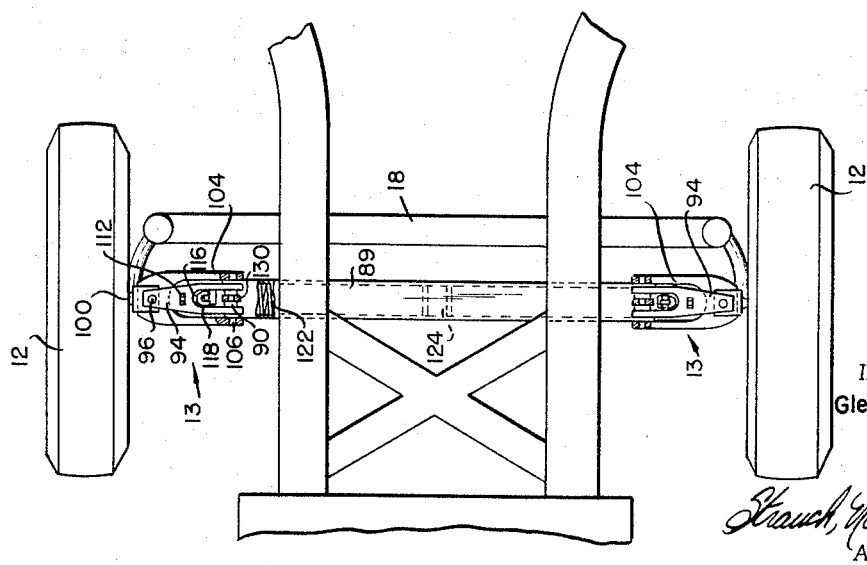
INVENTOR
Glen E. Mather
ATTORNEYS

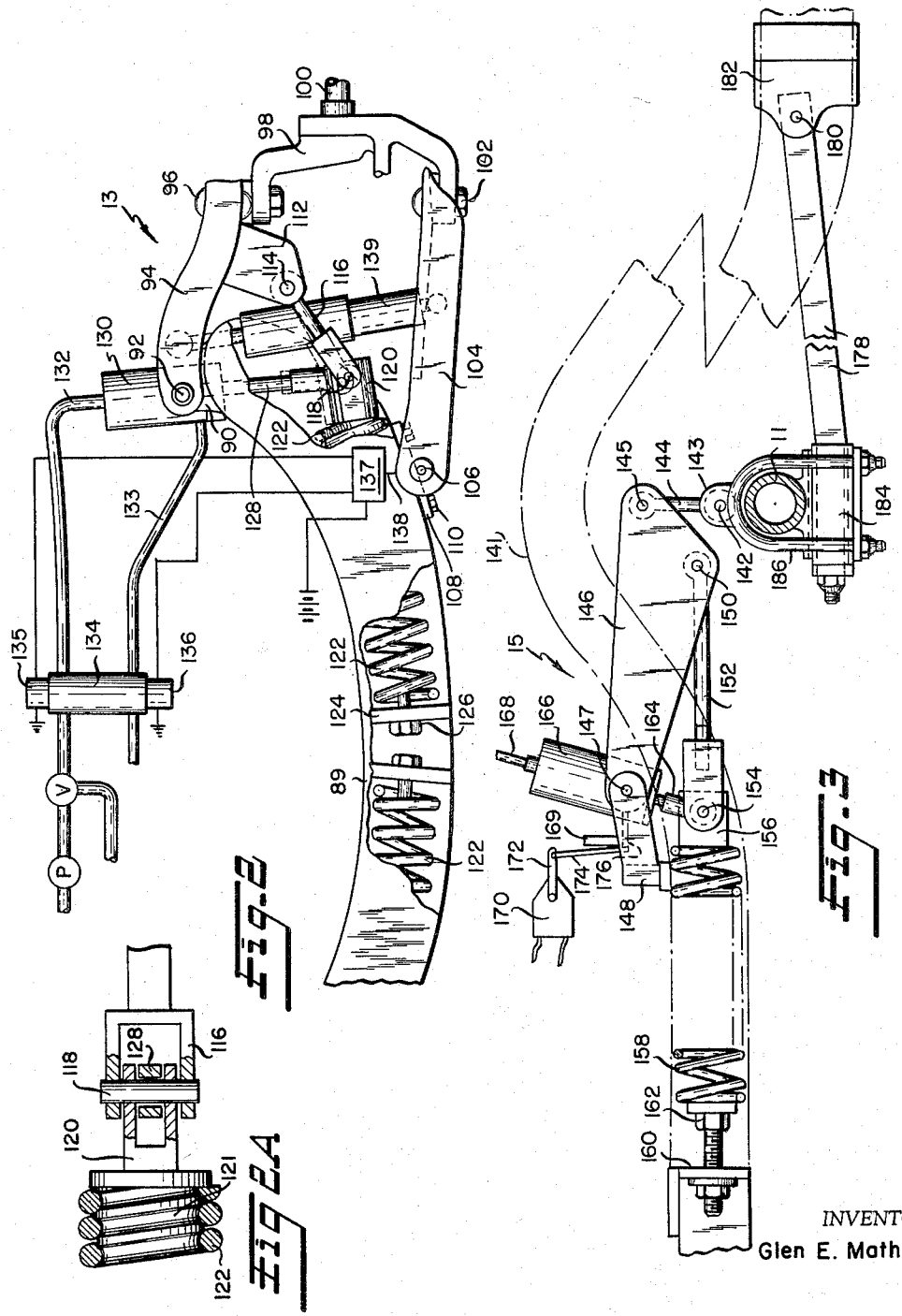

3,175,836
LOAD RESPONSIVE WHEEL SUSPENSION
FOR VEHICLES
Glenn E. Mather, Logansport, Ind., assignor to Rockwell-Standard Corporation, Coraopolis, Pa., a corporation of Pennsylvania
Original application Nov. 26, 1957, Ser. No. 698,981, now Patent No. 3,080,177, dated Mar. 5, 1963. Divided and this application May 29, 1962, Ser. No. 198,552
16 Claims. (Cl. 280—6)

This invention relates to vehicle wheel suspension apparatus for motor vehicles and more particularly to wheel suspension assemblies which include self-actuating fluid pressure operated levelizers.

Hydraulic levelizers are generally known and a variety of types have been designed to level the body frame under varying static and dynamic loads. Such devices have been widely used in buses and delivery trucks where the load changes constantly as shown, for example, in U.S. Patent No. 2,687,311 issued August 24, 1954. Hydraulic levelizers may be either fully automatic, self-actuating or controlled by the vehicle operator.

A primary object of this invention resides in the provision for vehicles of a novel combination of coil spring wheel suspension and levelizer in one assembly which is fully automatic and thus does not required the attention of the driver.

A further object of the invention resides in the provision of a spring suspension comprising a novel arrangement of support control arms pivotally mounted on the vehicle frame.

An additional object of the invention resides in the provision of a novel wheel suspension assembly including two support control arms pivotally connected to a frame member of a vehicle, one of the control arms having a spring connected thereto, the spring being shiftable in a line transverse to the axis of the coil spring to change the effective force applied by the spring to the control arm whereby the frame is maintained in a desired position in relation to the wheel axle.

A still further object resides in the provision of a novel vehicle combination including the vehicle frame supported by ground engaging wheels mounted on transverse axle assemblies with an automatic levelizing suspension mechanism on each wheel which substantially immediately individually adjusts the level of the frame portion adjacent each wheel relative to the position of the wheel whenever the relative positions change because of changed static or dynamic loads.

Still another object of the present invention resides in the provision of improved self-actuating levelizers for suspension assemblies, which include a valve which is closed or opened by movement of one of the suspension arms to actuate a fluid pressure motor to move the point of connection of the main load-carrying spring to a part of the suspension.

It is another object of the present invention to provide in an improved self-actuating hydraulic levelizer system for vehicle suspension assemblies, a valve which is closed and opened by means of a solenoid actuated by a two-way switch connected to one of the control arms of the levelizer.

It is a further object of the present invention to provide improved combined suspension and levelizing mechanisms which are adapted for use in the suspension of either front or rear wheels and which, when used to suspend the rear axle, permit the use of conventional rear end assemblies without torque tubes or radius arms found in other levelizing units since the load is transmitted directly by the spring suspension to the frame of the vehicle.

It is a further object of the present invention to provide improved self-actuating fluid operated levelizing systems which eliminate excessive body sway when the vehicle is taken around a curve and reduce or eliminate the brake dive at the front end of the vehicle when the brakes are applied.

It is an additional object of the present invention to provide improved wheel suspension systems which comprise inexpensive and easy to manufacture parts which are simply and quickly assembled and installed and which require a minimum of maintenance.

It is also an object of the present invention to provide improved fluid actuated fully automatic levelizing suspension systems of simple construction which require only low or moderate constant operating pressures.

Further novel features and other objects of this invention will become apparent from the following detailed description, discussion and the appended claims taken in conjunction with the accompanying drawings showing preferred structures and embodiment, in which:

FIGURE 1 is a top plan view of a motor vehicle frame supported by suspension and levelizing mechanism in accord with a preferred embodiment of this invention;

FIGURE 2 is an enlarged front elevation partially broken away and showing the front wheel suspension and levelizing assembly;

FIGURE 2A is a fragmentary view partly in section showing the outer end mounting of the coil spring of FIGURE 2, as well as the pivotal connections of the link and the piston rod of the motor with that mounting; and FIGURE 3 is a partial side elevation partially in section shown in rear wheel suspension and levelizing assembly.

In referring to the drawings for a detailed description of the invention, like reference characters will refer to like parts throughout. FIGURE 1 illustrates a motor vehicle frame 10 to which front wheels 12 are connected by independent spring suspension assemblies 13 of the present invention. Rear axle 11 which is supported by rear wheels 14 is connected to the frame by a pair of spring suspension assemblies 15. A power plant (not shown) is drive connected in conventional manner through a differential 16 and axle 11 to the rear wheels 14. The steering linkage includes the usual transverse tie rod 18.

FIGURE 2, to which detailed reference will now be made, illustrates a preferred embodiment of the suspension and levelizing mechanism of the invention as applied to steerable front wheels.

Indicated at 89 is a transverse vehicle frame member of generally U-shaped cross-section on one end of which is secured by welding or other suitable means an upper mounting bracket 90 to which is pivotally secured as at 92 an upper bifurcated control arm 94. The outer end of the control arm 94 is pivotally secured by a suitable ball and socket joint 96 to the upper end of a steering knuckle 98 having a spindle 100 for rotatably supporting a front wheel. The lower end of the steering knuckle 98 is connected by means of a ball and socket joint 102 to one end of a lower control arm 104 pivotally secured at its opposite end as at 106 to a lower mounting bracket 108 secured by bolts 110 over the open underside of the frame member 89.

A bracket 112, welded to the upper control arm 94, extends downwardly therefrom and pivotally supports as at 114 one end of a link 116 of constant length. The opposite end of link 116 is pivotally connected at 118 to a coil spring retainer cup 120 connected as by helical retainer grooves 121 to one end of a tension coil spring 122 housed by the frame member 89. The opposite end of the coil spring is secured adjacent the approximate centerline of the vehicle to a bracket 124 welded in the frame member, the spring end being held in place by means of a bolt 126.

Also fastened to the pivot pin 118 as within the bifurcated end of spring retainer cup 120 is the lower end of the piston rod 128 of a fluid pressure motor 130 pivotally mounted at 92 to upper mounting bracket 90. Fluid conduits 132 and 133 lead from chambers at opposite sides of the power piston within motor 130 to a solenoid operated valve 134 connected in turn to a suitable source of pressure and to exhaust. The valve 134, which is of conventional construction, is spring biased to a neutral or cut-off position in which both conduits 132 and 133 are isolated from the source of pressure and from exhaust and is moved in opposite directions to connect conduit 132 to pressure and conduit 133 to exhaust or vice versa by respective solenoids 135 and 136. Solenoids 135 and 136 in turn are actuated by a double pole switch 137 mounted on the frame member 89 and actuated by a member 138 movable with the lower control arm 104. The asesmbly is completed by a shock absorber 139 connected between the upper and lower control arms 94 and 104.

The rocking of the control arms 94 and 104 beyond a predetermined range caused either by an increase or a decrease in load operates the switch 137 to actuate one of the solenoids 135 or 136 to energize the fluid motor 130 to thereby change the relative position of pivot point 118 thereby lengthening or shortening the effective moment arm acting on the upper control arm 94.

FIGURE 3 illustrates an embodiment of the levelizer and suspension assembly for connecting the rear axle 11 to a longitudinal vehicle frame member 141.

Pivotally mounted as at 142 in a bracket 143 rigid with the axle 11 is a link 144 the upper end of which is pivotally connected as at 145 to one end of a triangular upper control arm 146. The opposite end of the control arm 146 is pivotally supported as at 147 on a bracket 148 rigid with the frame member 141. A link 152 corresponding to the link member 116 of FIGURE 2 is pivotally supported as at 150 on the lower vertex of the triangular control arm. The opposite end of the link 152 is pivotally secured as at 154 to a retainer plug 156 secured to one end of a coil spring 158 the opposite end of which is secured to a tension bracket 160 on the frame 141 by a conventional attachment assembly indicated generally at 162.

The free end of a piston rod 164 is connected to the pivot 154 on the spring retainer plug 156 and at its opposite end extends into the cylinder of a fluid pressure motor 166 which is pivotally secured by the pivot 147 to the bracket 148. The motor 166 is connected by conduits 168 and 169 to a solenoid operated valve identical with the valve 134. The valve operated solenoids are controlled by a switch 170 connected by operating links 172, 174 and 176 to the end of the upper control arm 146.

In this embodiment of the invention lower control arm 178 also functions as a torque rod or radius rod. Control arm 178 is pivotally connected as at 180 to a bracket 182 rigid with frame member 141 and is resiliently connected to the rear axle by U-bolts 186.

The rear suspension and levelizer assembly shown in FIGURE 3 operates in the same manner as the FIGURE 2 embodiment.

In both suspensions a change in load will result in turning of a control arm about its frame pivot, and this movement of the control arm will operate the electric switch, 137 or 170, to actuate the solenoid valve 134 to energize the fluid pressure motor (130 or 166) in the proper direction to displace the point of connection between the end of the tension spring, 122 or 158, to a position where the force exerted by the spring in the suspension changes to restore the control arm and the suspension linkage to original equilibrium or neutral condition whereby the height or level of the frame relative to the axle structure is restored and maintained. Thus constant level is obtained within the system.

The suspension and levelizing systems of the present invention can be used either for passenger cars or for heavy duty truck applications. In the latter case, for example, the rapid levelizing action of the system is effective to hold a trailer at the level of the loading dock throughout an entire loading or unloading operation.

Illustrative of the economy of manufacture of the members comprising the suspension levelizing mechanism of this invention the coil spring, for instance, can be made as an extension type spring of oil tempered wire functioning at very low stress which is the most economical of all types of manufacture. The control arms are preferably made from steel stampings. The ball and socket joints are of a well known conventional type. The hydraulic system is in general very simple and is operaitve at relatively low pressures of from 200–500 p.s.i.

In general, the present invention will considerably improve riding comfort and lessen fatigue imposed upon the driver of the vehicle over long distances.

This is a division of my copending application Serial No. 698,981 filed November 26, 1957 for Levelizing Suspension, now U.S. Letters Patent No. 3,080,177 issued March 5, 1963.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a levelizing spring suspension for a vehicle having a frame and an axle structure, a control arm pivotally conected at opposite ends to said frame and the axle structure, a coil spring, means on the frame suporting one end of said spring, force transmitting means comprising a rigid link pivoted at one end on said arm and at its other end to the other end of said spring, and fluid pressure means operably mounted between said frame and that said pivot between said link and said spring having a control circuit containing a valve actuated by changes in relative level of said frame and axle structure for automatically shifting said pivot between said link and said spring to vary the effective force exerted by said spring on said control arm.

2. In a self-leveling suspension for a vehicle having a frame adapted to be supported by an axle structure provided with a ground engaging wheel, upper and lower control arms flexibly connected at opposite ends to the axle structure and frame, a coil spring, means on the frame supporting one end of said spring, a rigid link pivoted at one end to said upper control arm and having at its other end a pivotal connection to said spring, power means for automatically shifting said pivotal connection in response to a change in relative level between the frame and the axle structure comprising a motor having a driven member operably connecting said pivotal connection and said frame, and control means for said power means actuated by movement of one of said control arms relative to said frame.

3. A levelizing spring suspension for supporting a vehicle frame on an axle structure comprising upper and lower members pivotally connected at one end to said frame, means flexibly connecting the other ends of said members to the axle structure to permit relative vertical movement between said axle structure and said frame, a spring assembly having one end connected to said frame, a link pivotally connecting the opposite end of said spring assembly to one of said members, and means automatically responsive to changes in level between the frame and said axle structure for shifting the pivotal connection between said spring assembly and said link.

4. A levelizing spring suspension for supporting a vehicle frame on a wheel comprising upper and lower control members pivotally connected to said frame, wheel axle structure flexibly connected to said members so as to permit controlled relative vertical movement between said axle structure and said frame, a coil spring anchored at one end on said frame, a link pivoted at opposite ends to the other end of said spring and the upper control member, and means automatically responsive to a change in the angle of pivot of one of said control members in relation to the frame for shifting the point of connection of said spring to said link to vary the effective force of said spring in the suspension.

5. In a levelizing spring suspension for a vehicle having a frame and an axle structure, a control arm pivotally connected at opposite ends to said frame and the axle structure, tension spring means, means on the frame supporting one end of said spring means, a force transmitting link pivoted at one end to said spring means and at its other end to said control arm, and power actuated means responsive to a change in relative level of said frame and axle structure for automatically shifting said pivot between the spring and control arm to vary the effective force exerted by said spring means on said control arm.

6. In a levelizing spring suspension for a vehicle having an axle structure adapted to support a frame, a control arm pivoted at opposite ends to said frame and said axle structure, a coiled tension spring having one end secured to the frame, a link having pivot connections to the other end of said spring and an intermediate portion of said control arm, and means responsive to changes in relative level of said frame and axle structure for automatically shifting the pivot connection of the link to the spring for varying the effective spring force acting on said control arm.

7. An assembly for spring suspending a vehicle frame on a ground engaging wheel comprising upper and lower members pivotally mounted on said frame, an axle structure for said wheel operatively connected to said members, a spring connected at one end to said frame, a link pivotally connected at one end to the opposite end of said spring and at the other end to one of said members, and a fluid pressure motor pivotally supported on said frame and having a piston rod, the free end of which is pivotally connected to said opposite end of said spring.

8. In a levelizing spring suspension for a vehicle having an axle structure adapted to support a frame, a control arm pivoted at opposite ends to said frame and said axle structure, a coil spring having one end anchored on said frame, a link having opposite end pivot connections to the other end of said spring and said control arm, and means automatically responsive to changes in relative level of said frame and axle structure for shifting the pivot connection of said link to said spring for varying the effective spring force acting on said control arm comprising a motor pivoted on the frame on the same axis as said control arm and having a fluid pressure responsive element connected to said pivot between the link and the spring.

9. In the suspension defined in claim 8, said motor having a fluid pressure control circuit having a valve, and means operatively connecting said control arm to actuate said valve.

10. A levelizing spring suspension for supporting a vehicle frame on an axle structure comprising upper and lower members pivotally connected at one end to said frame, means flexibly connecting the other ends of said members to the axle structure to permit relative vertical movement between said axle structure and said frame, a spring assembly having one end connected to said frame, a link pivotally connecting the opposite end of said spring assembly to the upper member, and means automatically responsive to changes in level between the frame and said axle structure for shifting the pivotal connection between said spring assembly and said link comprising a reversible fluid pressure motor pivoted on the frame coaxially with said upper member and having a downwardly extending pressure responsive element connected to the pivot between the link and said spring assembly.

11. In the suspension defined in claim 10, said motor having a fluid pressure control circuit containing a reversing valve, and means connected to one of said members for actuating said valve.

12. In the suspension defined in claim 11, said valve being a solenoid valve, and said valve actuating means comprising a switch operated by said one member and electrically connected to said valve.

13. A levelizing spring suspension for mounting a vehicle frame on a transversely extending rear axle assembly having a housing supported by ground engaging wheels comprising upper and lower longitudinally extending members pivotally connected at one end to said frame, means flexibly connecting the other ends of said members to the rear axle housing to permit relative vertical movement between said axle assembly and said frame, a longitudinally extending coil spring assembly having one end mounted on said frame, a rigid link pivotally connecting the opposite end of said spring assembly to the upper of said support members, the pivotal connection between the link and spring assembly lying adjacent and below the frame pivot of said upper member, and means automatically responsive to changes in level between the frame and said axle assembly for vertically shifting the pivotal connection between said spring assembly and said link comprising a fluid pressure motor pivoted on the frame coaxially of said upper member and having a motion transmitting connection to said pivotal connection between the spring assembly and link, said motor having a control circuit containing a reversing valve operably connected to said upper member.

14. In the levelizing suspension defined in claim 13, said members extending oppositely with respect to said axle housing.

15. A levelizing spring suspension for mounting each side of the front end of a vehicle frame on independent wheel axle structure comprising upper and lower generally parallel members pivotally connected at their inner ends to said frame and extending transversely between said frame and said axle structure, means flexibly connecting the other ends of said members to said axle structure to permit controlled relative vertical movement between said axle structure and said frame, a coil spring assembly having one end anchored to said frame and extending transversely toward said axle structure, a rigid link pivotally connecting the outer end of said spring assembly to said upper member, the pivotal connection between the link and spring assembly lying vertically between said members, and means automatically responsive to changes in level between the frame and said axle structure for shifting the pivotal connection between said spring assembly and said link comprising a fluid pressure motor pivoted on the frame coaxially of said upper member and operably connected to said pivotal connection between the spring assembly and said links, said motor having a control circuit containing a reversing valve operably connected to said lower member.

16. In the levelizing suspension defined in claim 15, a shock absorber connected directly between said members.

References Cited in the file of this patent

UNITED STATES PATENTS

| | | |
|---|---|---|
| 1,880,343 | Dunn | Oct. 4, 1932 |
| 2,351,291 | Ross | June 13, 1944 |
| 2,782,049 | Peras | Feb. 19, 1957 |
| 2,882,041 | Gustafson | Apr. 14, 1959 |